United States Patent
Hass et al.

(10) Patent No.: US 10,237,184 B2
(45) Date of Patent: Mar. 19, 2019

(54) RESOURCE MANAGEMENT SYSTEM

(71) Applicant: Dell Products L.P., Round Rock, TX (US)

(72) Inventors: Jon Robert Hass, Austin, TX (US); Christopher Abella Poblete, Austin, TX (US); Srihari Srirangam, Khammam (IN)

(73) Assignee: Dell Products L.P., Round Rock, TX (US)

( * ) Notice: Subject to any disclaimer, the term of this patent is extended or adjusted under 35 U.S.C. 154(b) by 277 days.

(21) Appl. No.: 15/181,993

(22) Filed: Jun. 14, 2016

(65) Prior Publication Data

US 2017/0359440 A1 Dec. 14, 2017

(51) Int. Cl.
*G06F 15/173* (2006.01)
*H04L 12/70* (2013.01)
*H04L 12/24* (2006.01)
*H04L 29/08* (2006.01)

(52) U.S. Cl.
CPC ............ *H04L 47/00* (2013.01); *H04L 41/044* (2013.01); *H04L 67/02* (2013.01); *H04L 67/16* (2013.01)

(58) Field of Classification Search
USPC ................ 709/223, 239, 224, 232, 238, 230
See application file for complete search history.

(56) References Cited

PUBLICATIONS

Jeff Autor, "DMTF, Introduction to Redfish, DMTF Scalable Platforms Management Forum," May 2016, 13 Pages, www.dmtf.org.
URI Conventions (OData Version 2.0)—OData—the Best Way to Rest, URI Conventions (OData Version 2.0), 2015, 15 Pages, http://www.odata.org/documentation/OData-version-2-0/uri-conventions/.
T. Berners-Lee, R. Fielding and L. Masinter, "Uniform Resource Identifier (URI): Generic Syntax," Network Working Group Request for Comments: 3986, STD: 66; Updates: 1738, Obsoletes: 2732, 2396, 1808, Category: Standards Track, Jan. 2005, 59 Pages, http://www.idtf.org/rfc/rfc3986.txt.

*Primary Examiner* — Lan Dai T Truong
(74) *Attorney, Agent, or Firm* — Haynes and Boone, LLP

(57) ABSTRACT

A resource management system that includes at least one managed computing system including a plurality of hierarchal computer resources and a server computing system that is coupled to the at least one managed computing system through a network. The server computing system includes a broker in communication with a plurality of providers. The broker is configured to receive a Uniform Resource Identifier (URI) request for a first resource of the plurality of hierarchal computer resources included in the at least one managed computing system. The URI request includes a resource path that identifies the first resource by a hierarchy of a plurality of collections. The broker is configured to determine a last collection in the hierarchy of the plurality of collections that matches a first provider of the plurality of providers, and forward the request directly to the first provider such that the first provider processes the URI request.

20 Claims, 7 Drawing Sheets

RESOURCE MANAGEMENT SYSTEM

BACKGROUND

The present disclosure relates generally to information handling systems, and more particularly to a resource management system for routing Uniform Resource Identifier (URI) requests from information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems include a multitude of systems, subsystems, resources, resource settings and data, and other hardware and software that generates useful information and requires management. Often such management of information handling systems is performed remotely from a client computing system. Emerging requirements for a modern system management Application Program Interface (API) include being Representational State Transfer (REST) based via, for example, utilization of the Distributed Management Task Force (DMTF) Redfish standard while leveraging open source software (e.g., Apache web server software) in the implementation. Such implementations typically include web servers that employ brokers that utilize a static mapping mechanism (often in the form of a static file) to route Uniform Resource Identifier (URI) requests to providers, which may be provided by plugin code that performs the processing of the URI request. REST-based system management APIs use the concepts of collections, where members of collections are resources that are identified by a specific URI path. A member of a collection may be included in a collection whose other members may be included in other collections, and so on, creating a hierarchical-collections-based URI path. It has been found that existing open source infrastructure methodologies for statically mapping URI paths to members do not handle the notion of hierarchical collections adequately. Additionally, the members of a collection can dynamically change, creating further complications to the static mapping of URI paths to members. As such, current resource management systems require providers of topmost collections to be particularly complex, as those providers must be configured to handle all sub-collections and dynamic members, and this complexity introduces a barrier to modularity and robustness in the implementation.

Accordingly, it would be desirable to provide an improved resource management system.

SUMMARY

According to one embodiment, an Information Handling System (IHS) includes a communication system; a processing system that is coupled to the communication system; and a memory system that is coupled to the processing system and that includes instructions that, when executed by the processing system, cause the processing system to provide a management engine that includes a broker and a plurality of providers, wherein the broker is configured to: receive a Uniform Resource Identifier (URI) request for a first resource of a plurality of hierarchal computer resources included in the at least one managed computing system, wherein the URI request includes a resource path that identifies the first resource by a hierarchy of a plurality of collections; determine a last collection in the hierarchy of the plurality of collections that matches a first provider of the plurality of providers; and forward the request directly to the first provider such that the first provider processes the URI request.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O)

devices, such as a keyboard, a mouse, touchscreen and/or a video display. The information handling system may also include one or more buses operable to transmit communications between the various hardware components.

Figure 1:
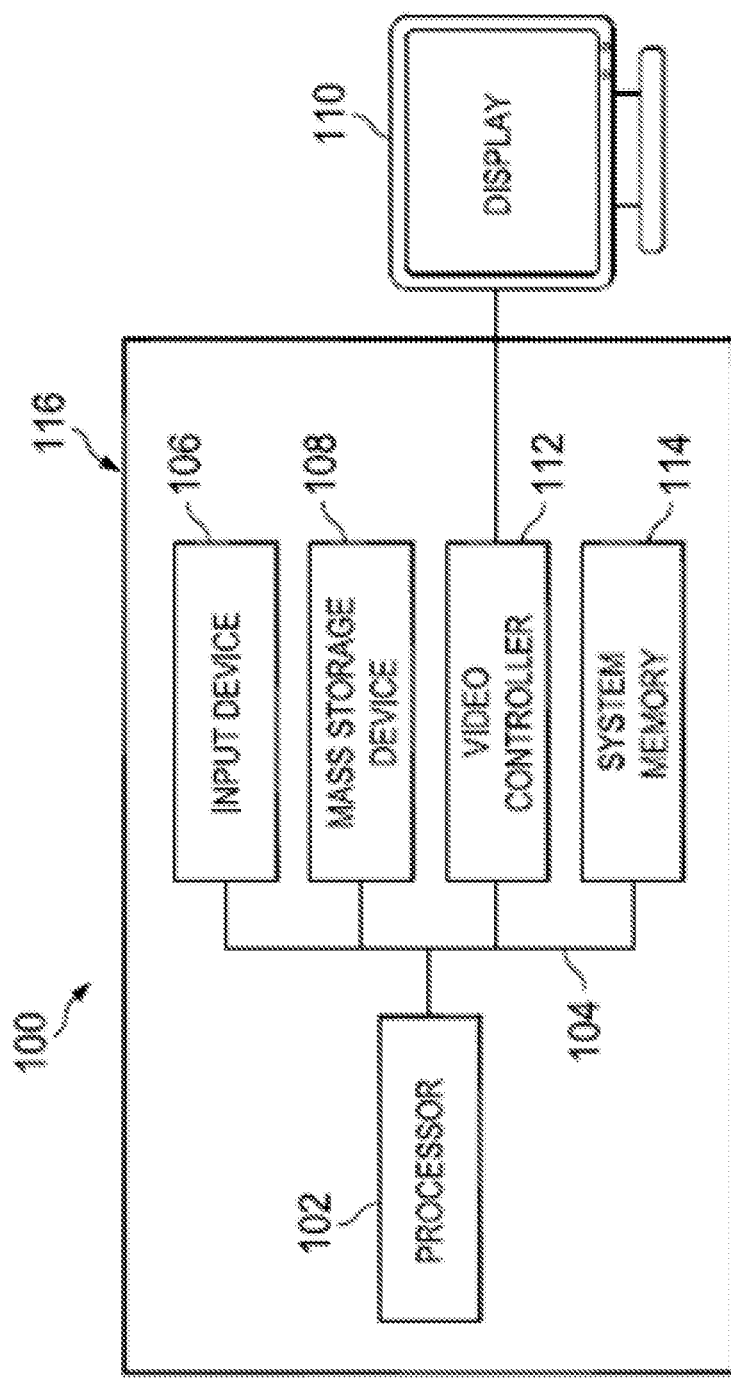
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
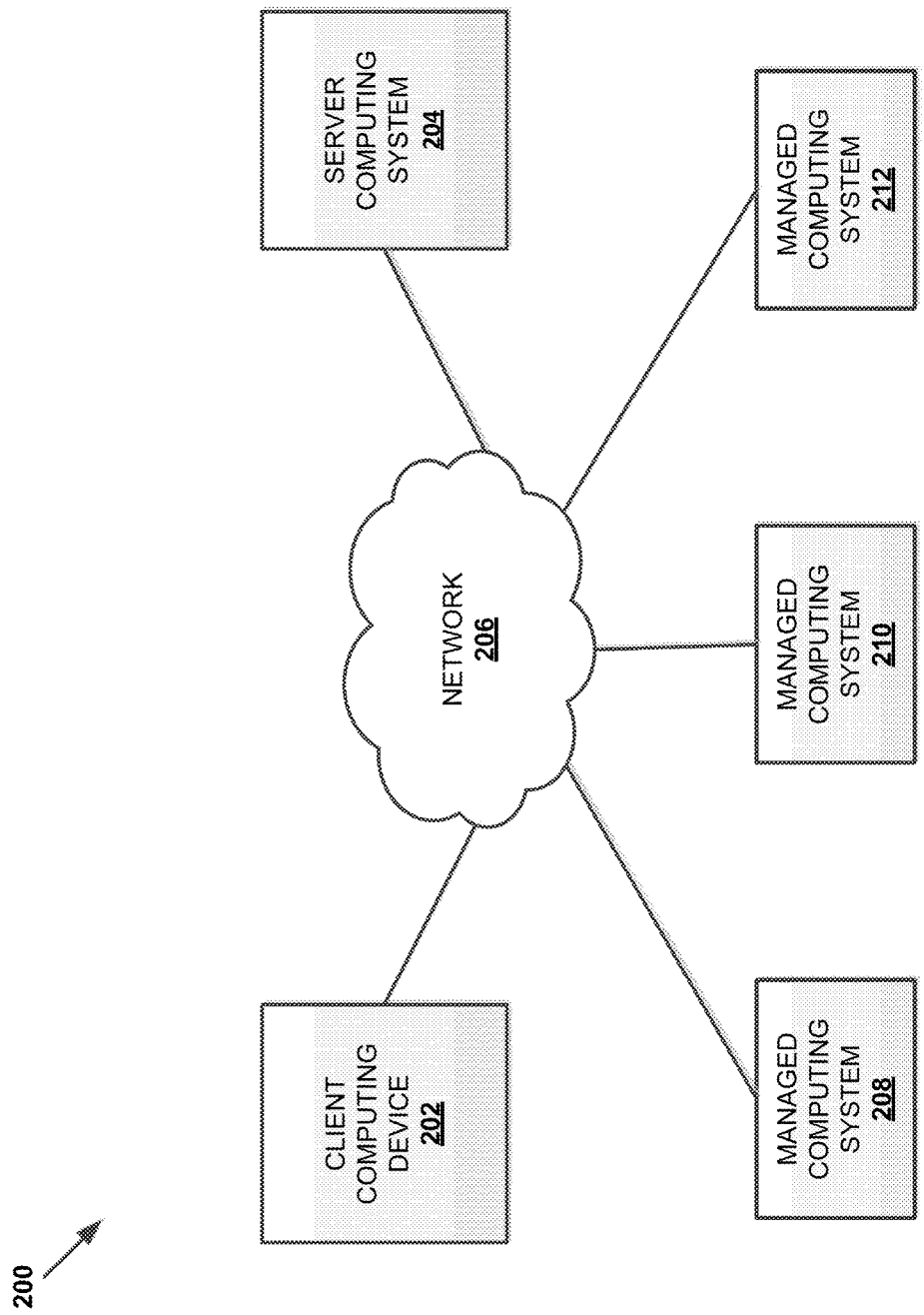
FIG. 2 is a schematic view illustrating an embodiment of a resource management system.

Referring now to FIG. 2, an embodiment of a resource management system 200 is illustrated. The resource management system 200 includes a client computing device 202 which may be the IHS 100 discussed above with reference to FIG. 1 and/or include some or all of the components of the IHS 100. For example, the client computing device 202 may be a server computing device, a desktop computing device, a laptop/notebook computing device, a tablet computing device, a mobile phone, and/or a variety of other computing devices known in the art. The resource management system 200 also includes a server computing system 204 that includes one or more server computing devices which may be provided by the IHS 100 discussed above with reference to FIG. 1 and/or include some or all of the components of the IHS 100. Furthermore, the resource management system 200 includes a network 206 that couples the client computing device 202 to the server computing system 204. In an embodiment, the network 206 may include a local area network (LAN), the Internet, and/or a variety of other networks known in the art. In the illustrated embodiment, the network 206 may couple the client computing device 202 to the server computing system 204 and a plurality of managed computing systems 208, 210, and 212. However, in other embodiments, any or all of the managed computing system 208-212 may be coupled directly to the server computing system 204 and may communicate with the client computing device 202 through the server computing system 204 and via the network 206.

Any or all of the managed computing system 208-212 may be the IHS 100 discussed above with reference to FIG. 1 and/or include some or all of the components of the IHS 100. In specific embodiments discussed below the managed computing systems 208-212 are described as including servers, rack subsystems, and/or resources within a chassis, although other computing systems (e.g., desktop computing devices, laptop/notebook computing devices, tablet computing devices, networking devices, etc.) are envisioned as benefiting from the teachings of the present disclosure and thus falling within its scope. In a specific example, the managed computing systems 208-212 are provided in one or more datacenters. While a specific embodiment of a resource management system 200 has been illustrated and described, one of skill in the art in possession of the present disclosure will recognize that a wide variety of modification to the resource management system 200 will fall within the scope of the present disclosure, including combining components, modifying components, adding components, removing components, distributing components across multiple chassis, and the like.

Figure 3:
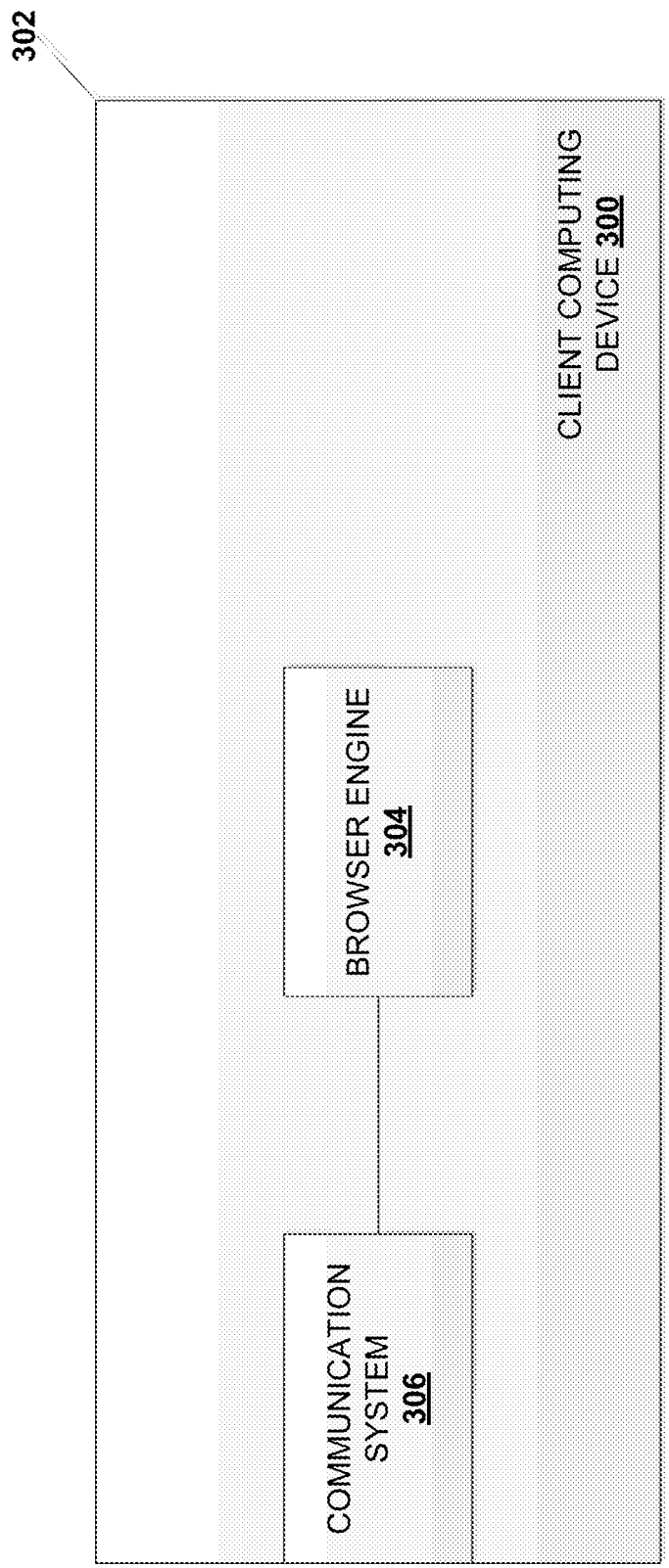
FIG. 3 is a schematic view illustrating an embodiment of a client computing device of the resource management system of FIG. 2.

Referring now to FIG. 3, an embodiment of a client computing device 300 is illustrated that may be the client computing device 202 discussed above with reference to FIG. 2. As such, the client computing device 202 may be the IHS 100 discussed above with reference to FIG. 1 and/or may include some or all of the components of the IHS 100, and in specific embodiments may include a server computing device, a desktop computing device, a laptop/notebook computing device, a tablet computing device, a mobile phone, and/or a variety of other computing devices known in the art. The client computing device 300 includes at least one chassis 302 that houses the components of the client computing device 300, only some of which are illustrated in FIG. 3. For example, the chassis 302 may include a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a browser engine 304 (e.g., web browser or any software application for retrieving, presenting, and traversing information over a network) that is configured to perform the functions of the browser engines and client computing devices discussed below including, for example, transmitting Uniform Resource Identifier (URI) requests according to the method 500. The chassis 302 also houses a communication system 306 that is coupled to the browser engine 304 (e.g., via a coupling between the communication system 306 and the processing system) and that may include a network interface controllers (NIC), a wireless communication device, and/or any other communication subsystem that provides for the communication connections between the client computing device 202/300 and the server computing system 204 to allow for the communications discussed below. The client computing device 300 also may include a storage device (not illustrated, but which may be the storage device 108 discussed above with reference to FIG. 1) that is coupled to the browser engine 304 (e.g., via a coupling between the storage device and the processing system) and that may store information utilized by the browser engine 304 to provide the functionality discussed below. While a specific embodiment of a client computing device 300 has been illustrated and described, one of skill in the art in possession of the present disclosure will recognize that a wide variety of modification to the client computing device 300 that allows for the functionality discussed below, as well as conventional functionality known in the art, will fall within the scope of the present disclosure.

Figure 4:
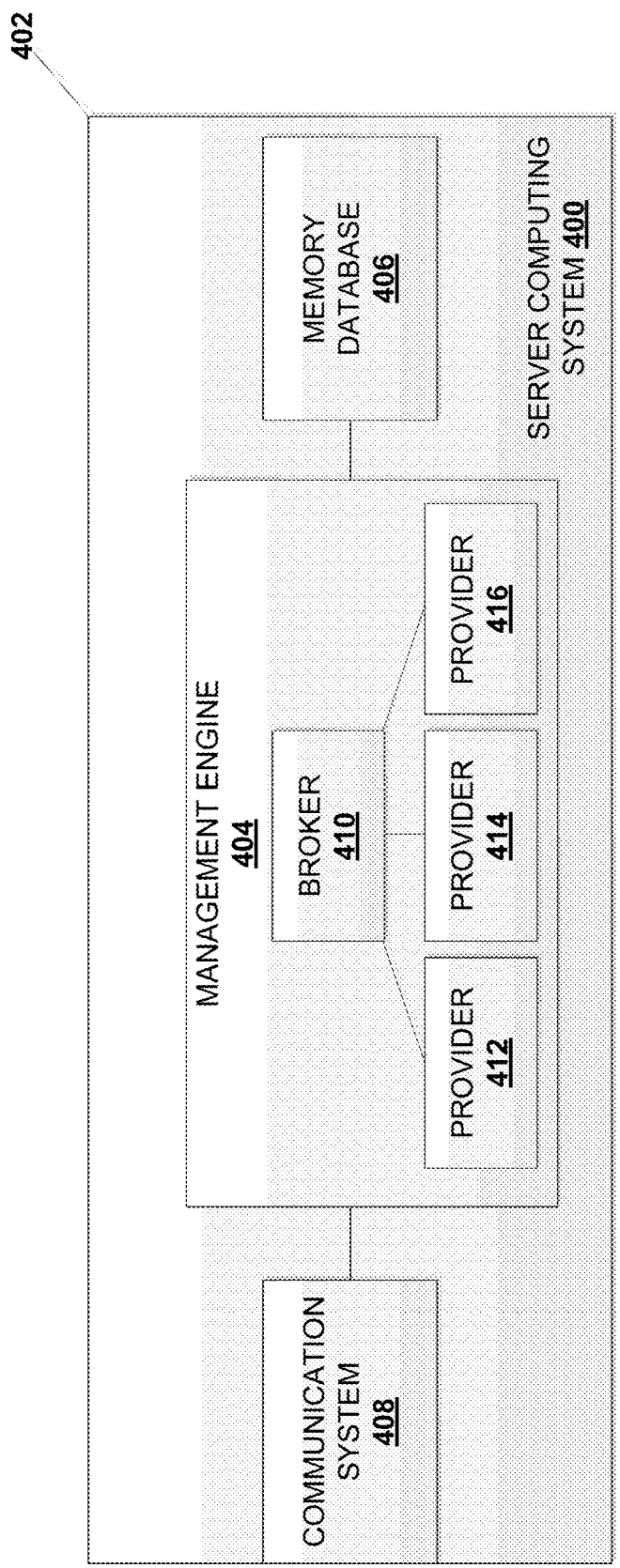
FIG. 4 is a schematic view illustrating an embodiment of a server computing system of the resource management system of FIG. 2.

Referring now to FIG. 4, an embodiment of a server computing system 400 is illustrated that may be the server computing system 204 discussed above with reference to FIG. 2. As such, the server computing system 400 may be the IHS 100 discussed above with reference to FIG. 1 and/or may include some or all of the components of the IHS 100, and in specific embodiments may include one or more server computing devices. The server computing system 400 includes a chassis 402 that houses the components of the server computing system 400, only some of which are illustrated in FIG. 4. For example, the chassis 402 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a management engine 404 that is configured to perform the functions of the management engines and server computing devices discussed below including, for example, routing and processing a URI request according to the method 500. The management engine 404 is a web service (e.g., an Apache web service) and may include a broker 410 and a plurality of providers 412, 414, 416. Although providers 412, 414, and 416 are illustrated any number of providers may be contemplated. In an embodiment, the broker 410 is an object broker (e.g., an Open Data Protocol Lite (ODataLite) object broker) that maps a resource path in a URI to at least one of the plurality of providers 412-416, which may be provided by plug-ins that perform the processing of a URI request that includes a URI. However, other types of brokers and providers will fall within the scope of the present disclosure as well.

The chassis 402 may also house a communication system 408 that is coupled to the management engine 404 (e.g., via a coupling between the communication system 408 and the processing system) and that may include a network interface controllers (NIC), a wireless communication device, and/or any other communication subsystem that provides for the communication connections between the client computing device 202/300 and/or the managed computing systems 208-212 that allow for the communications discussed below. The chassis 402 also may house a storage device (not illustrated, but which may be the storage device 108 discussed above with reference to FIG. 1) that is coupled to the management engine 404 (e.g., via a coupling between the storage device and the processing system) and that includes a memory database 406 that is configured to store mappings of collections to providers (e.g., providers 412-416) as discussed in further detail below. While a specific embodiment of a server computing system 400 has been illustrated and described, one of skill in the art in possession of the present disclosure will recognize that a wide variety of modification to the server computing system 400 that allows the server computing system 400 to perform the functionality discussed below, as well as conventional functionality known in the art, will fall within the scope of the present disclosure.

Figure 5:
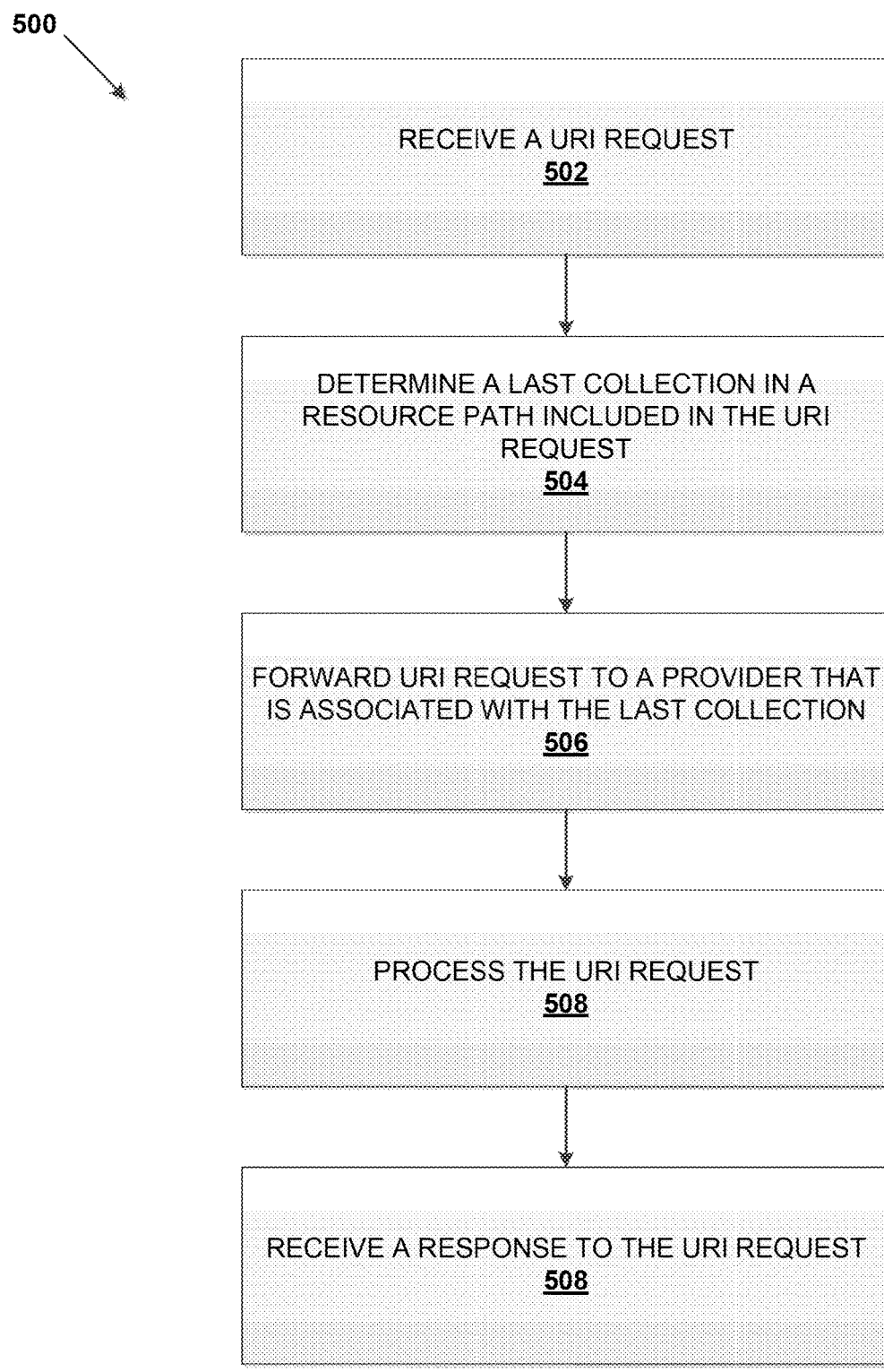
FIG. 5 is a flow diagram illustrating an embodiment of a method for routing Uniform Resource Identifier (URI) requests by the server computing system of FIGS. 2 and 4.

Referring now to FIG. 5, an embodiment of a method 500 for performing resource management according to URI requests is illustrated. As discussed below, a server computing system may receive a URI request from a client computing device that includes a resource path for a resource of a plurality of hierarchal computer resources included in a managed computing system. The resource path defines the resource by a hierarchy of a plurality of collections. The server computing system includes a management engine having a broker and a plurality of providers, and the broker identifies the last collection of the hierarchy of the plurality of collections in the resource path that matches one of the plurality of providers, and then forwards the URI request to that provider to process the URI request. The method 500 allows for the routing of URI requests that include a hierarchy of a plurality of collections to providers that process the request without a whitelist of all URI's in a collection-to-provider mapping file at a broker. Therefore, the broker is offloaded and can be made generic to work on any server computing system. As such, the method 500 allows for processing URI requests that include collections whose members dynamically change, and eliminates the complexity of providers of topmost collections by relieving those providers from having to handle all sub-collections and dynamic members.

The method 500 begins at block 502 where a Uniform Resource Identifier (URI) request for a first resource of a plurality of hierarchal computer resources included in at least one managed computing system is received. In an embodiment, the URI request includes a resource path that identifies the first resource by a hierarchy of a plurality of collections. For example, at block 502, the server computing system 400 may receive from the client computing device 300 a URI request for a first resource of a plurality of hierarchal computer resources included in any one of the managed computing systems 208-212. The server computing system 400 includes the management engine 404 that includes the broker 410 and the plurality of providers 412-416, and the management engine 404 may be a Representational State Transfer (REST) based system management Application Program Interface (API). For example, the management engine 404 may include a Distributive Management Task Force (DMTF) Redfish interface, Apache Web Service, and other REST based interfaces known in the art. The broker 410 may serve the URI request by loading the appropriate provider of the plurality of providers 412, 414, 416. As would be understood by one of skill in the art in possession of the present disclosure, REST based management systems communicate over Hypertext Transfer Protocol (HTTP) with HTTP methods (e.g., GET, POST, PUT, DELETE, PATCH, etc.) that are used to retrieve webpages and send data to servers. As such, the URI request may include an HTTP method as well as a URI. The URI may include a resource path to a resource of a plurality of hierarchal computer resources (e.g., hardware resources and software resources) included in any one of the managed computing systems 208-212. A provider of the plurality of providers 412, 414, 416 may provide data of the resource identified in the URI request in a REST based format.

Figure 6:
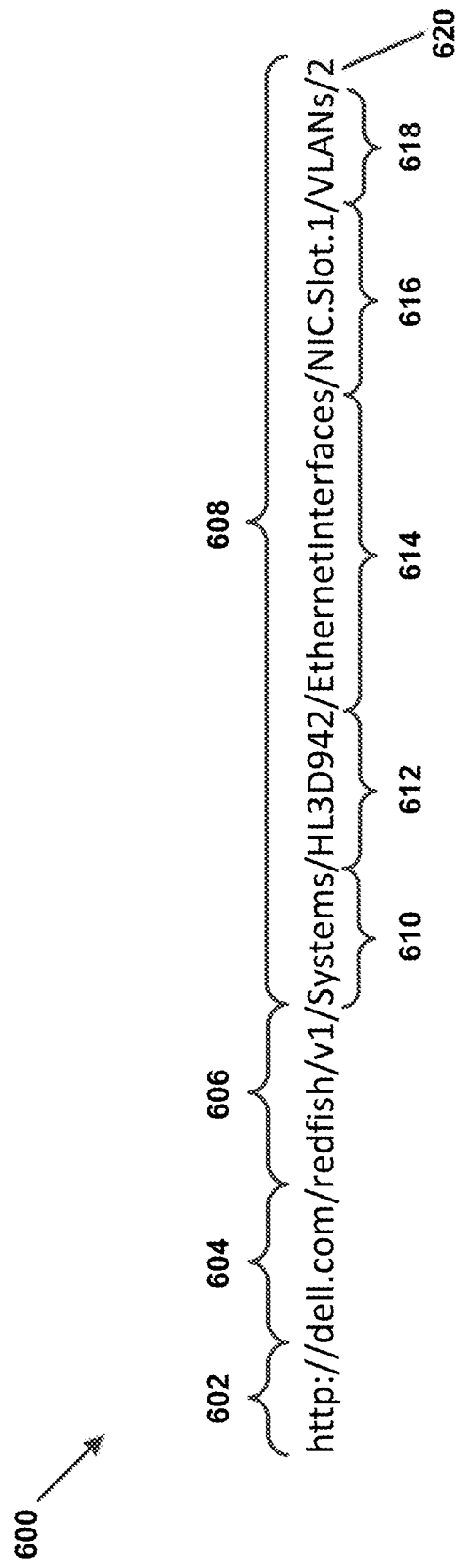
FIG. 6 is an example of a URI included in a URI request.

FIG. 6 illustrates an example of a URI 600 that may be included in the URI request at block 502. In the illustrated embodiment, the URI includes a transport scheme 602 (e.g., HTTP, HTTPS), a host name 604 (e.g., dell.com), a service root 606 (e.g., redfish/v1), and a resource path 608. As would be understood by one of skill in the art in possession of the present disclosure, the service root 606 is the entry point or root of the resource path 608, and the resource path 608 is the address for a resource. The plurality of hierarchal computer resources may be linked from the service root 606, and any of those resources may be configured to receive and process messages such as the URI request. In different embodiments, the resource may be either an individual entity, or a collection that acts as a container for several other entities.

Figure 7:
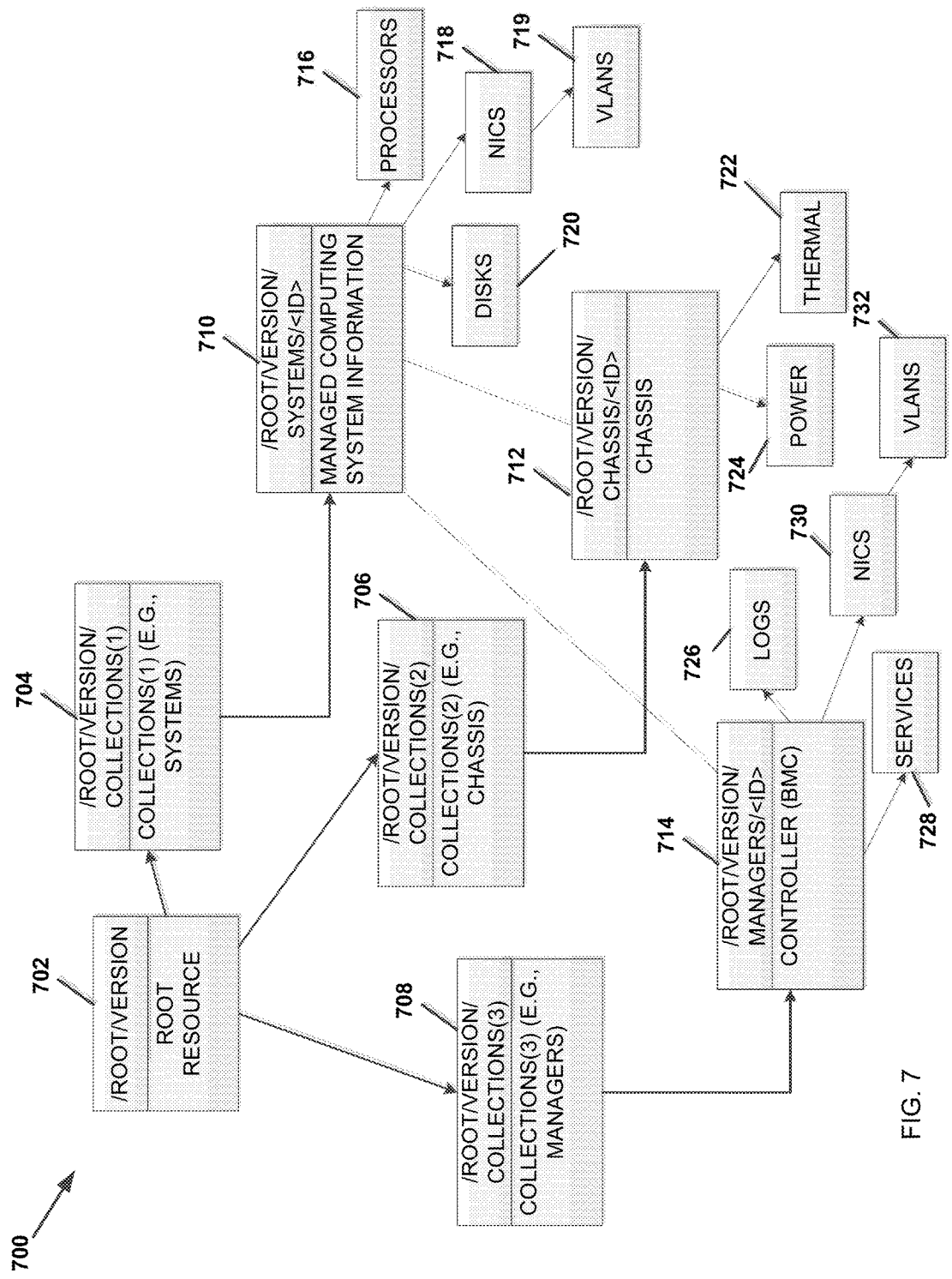
FIG. 7 is a block diagram of a resource map illustrating an embodiment of a hierarchy of resources provided by the managed computing systems of FIG. 2.

FIG. 7 illustrates an example of a resource map 700 of a plurality of hierarchal computer resources that may be included in at least one of the managed computing systems 208-212. In the illustrated embodiment, the resource map 700 starts at the service root 702, which is linked to one or more first level collections (e.g., systems collections 704, chassis collections 706, and manager collections 708 in FIG.

7). For example, the systems collections 704 may include a plurality of computing systems resources that roughly correspond to a logical view of a managed computing system as seen from an operating system, and includes resources need to run the managed computing systems. Similarly, the chassis collections 706 may include a plurality of chassis resources that roughly correspond to a physical view of a managed computing system as seen by a user. Similarly, the manager collections 708 may include a plurality of managers and the resources needed to perform administrative functions such as those of a system management subsystem such as a baseboard management controller. In an embodiment, the first level collections 704-708 each have one or more members which are resources within a collection. For example, member 710 may be a specific computing device in the systems collections 704, member 712 may be a specific chassis in the chassis collections 706, and member 714 may be a specific controller in the manager collections 706. Furthermore, each of the members 710-714 may be linked to one or more members in second level collections (e.g., processor collections 716, network interface controllers (NICs) collections 718 and 730, disk drives collections 720, thermal resources collections 722, power resources collections 724, log collections 726, and service collections 728 illustrated in FIG. 7). Furthermore, members of second level collections may include third level collections (e.g., VLANS collections 719 and 732 that are linked to members of NICs collections 718 and 730 respectively, and so on. Although specific collections are illustrated as first level collections, second level collections, and third level collections, one skilled in the art will recognize that some collections may be at various levels within a hierarchy of the resource map 700 and some collections may appear more than once within the hierarchy of the resource map 700.

Referring back to FIG. 6, the resource path 608 may provide an address to a particular resource of the resource map 700. As illustrated, the resource path 608 may include a hierarchy of a plurality of collections starting from the left of the URI to the right of the URI in the Figure. For example, resource path 608 includes a first collection 610, which may be the systems collections 704 discussed above in FIG. 7. A member 612 (i.e., "HL3D942" in FIG. 6) of the first collection 610 may follow that first collection 610 and may identify a specific computing system. The resource path 608 also includes a second collection 614, which is a second level collection to the first collection 610 and, in the illustrated embodiment, provides a collection of Ethernet interfaces (e.g., the NICs collections 718 discussed in FIG. 7). A member 616 (e.g., "NIC.Slot.1" in FIG. 6) of the second collection 614 may follow that second collection 614 and may identify a specific Ethernet interface. The resource path 608 also includes a third collection 618, which is a third level collection to the second collection 614 and, in the illustrated embodiment, provides a collection of virtual local area networks (VLANs). A member 620 (e.g., "2" in FIG. 6) of the third collection 618 may follow that third collection 618 and may identify a specific VLAN. While a specific resource path 608 is illustrated and described, one of skill in the art in possession of the present disclosure will recognize that resource paths may vary and includes a variety of different information while remaining within the scope of the present disclosure.

The method 500 then proceeds to block 504 where a last collection in the hierarchy of the plurality of collections that matches a first provider of a plurality of providers is determined. As discussed above, the plurality of providers 412-416 in the management engine 404 are included in the server computing system 400 and are each configured to process the URI request. In an embodiment, at block 504, the broker 410 of the management engine 404 may determine the last collection in the hierarchy of the plurality of collections in the URI request that matches a provider of the providers 412-416. In an embodiment, to determine the last collection in the hierarchy of the plurality of collections in the URI request that matches a provider, the broker 410 may scan the resource path (e.g., left to right, right to left, etc.) and match each collection in the hierarchy of collections defined by the resource path to a respective provider of the plurality of providers 412-416 in the management engine 404. For example, the broker 410 may determine a set of providers configured to process each collection in the resource path, and the broker 410 may then map each collection in the resource path to a respective provider of the set of providers to generate a collection-to-provider map. In a specific example using the resource path 608 of FIG. 6, the broker 410 may generate a collection-to-provider mapping that uses a greedy quantifier (e.g., "+" or "*" in the collection-to-provider mapping). For example, a collection-to-provider mapping of the URI 600 may include the following:

Systems, Systems/*:systemprovider
EthernetInterfaces, EthernetInerfaces/*:ethernetinterfaceprovider
VLANs, VLANs/*:vlanprovider In an embodiment, the "systemprovider" provider may be configured to process the first collection 610 of systems and all members of the first collection 610, the "ethernetinterfaceprovider" provider may be configured to process the second collection 614 of Ethernet interfaces and all members of the second collection 614, and the "vlanprovider" provider may be configured process the third collection 618 of VLANs and all members of the third collection 618.

The broker 410 loads a provider of the plurality of providers 412-416 based on the URI received. Since the URI may include plurality of other resource collections, it is important for the broker to load the appropriate provider to get the requested resource details. Using greedy characters or traversing from left to right is a mechanism to load appropriate provider based on the received URI. Also use of greedy characters helps in modularizing the code at the providers. For example, if there is no such processing, as stated above, the systems provider should serve all collections (including Ethernet, VLANS), which creates problem in modularizing the code and system provider has to validate the URI, which may increase the processing time. With introduction of a greedy character and parsing the URI from left to right, the broker 410 can choose an appropriate provider, due to which the processing time of the request would decrease, as the appropriate provider of the plurality of providers 412-416 is loaded and URI checks would be already validated at the broker, hence avoiding to check the URI again at provider. If the greedy character is not present, this would require whitelist of all URIs in the collection-to-provider mapping file. VLANS may exist on systems resources and on managers resources. With help of hierarchical URI parsing, the same provider can serve both requests for VLAN. For example VLAN provider will serve the URIs:

. . . /Systems/<id>/EthernetInterfaces/<id>/VLANS/<Id>and

. . . /Managers.<id>/EthernetInterfaces/<id>/VLANS/<Id>.

The collection-to-provider map may then be stored in the memory database 406, and the broker 410 may then scan the resource path and match each collection and member to a provider (e.g., the providers in the collection-to-provider map) until the last provider in the resource path is found. For example, with reference to the resource path 608 of FIG. 6, the broker 410 may begin the scan from the right of the resource path 608 in the Figure and determine whether the member 620 (e.g., "2") is a collection. Because "2" is not a collection, the broker 410 will move to the left of the resource path 608 in the Figure to the next resource in the resource path 608 which is the third collection 618 (e.g., VLANs). The broker 410 may then determine from the collection-to-provider map that the third collection 618 (e.g., VLANs) is a collection that is mapped to a provider(e.g., "vlansprovider"), and the broker 410 may also determine that the VLANs/2 is the last collection in the resource path 608 (i.e., because the broker 410 scanned the resource path from right to left of the Figure (or from the end of the resource path 608 and towards the beginning of the resource path 608, or from the last entry in the resource path 608 towards the first entry in the resource path 608)). Next, the broker 410 may identify the collection (e.g., third collection 618 "VLANs") as the last collection in the hierarchy of the plurality of collections. For example, the broker 410 may check the string(VLANs) against the entries in the collections to provider mapping. If the string is matched, the broker 410 will load the VLAN provider.

The method 500 then proceeds to block 506 where the URI request is forwarded to a first provider that is associated with the last collection determined at block 504. In an embodiment, at block 506, the broker 410 may forward the URI request to the provider matched to the last collection in the hierarchy of the plurality of collections. Additionally, the broker 410 may forward a pointer to the last collection in the URI request to the provider matched to the last collection in the hierarchy of the plurality of collections. Continuing the specific example using the URI request 600 of FIG. 6, the URI request that includes the URI 600 of FIG. 6 will be forwarded to the provider "vlansprovider", along with a pointer to the third collection 618 (e.g., "VLANs") in the resource path 608 (i.e., because VLANs is the last collection in the resource path 608.)

The method 500 then proceeds to block 508 where the URI request is processed. In an embodiment, the first provider of the plurality of providers 412-416 that was matched to the last collection in the hierarchy of the plurality of collections processes the URI request. The first provider may validate the identifiers of the URI to determine whether a resource with such an identifier exists. For example, the first provider may be configured to validate the hierarchy of the plurality of collections included in the resource path. Furthermore, the first provider may be configured to validate that a first member identified in the last collection is contained within a second member that is identified in a second collection that is included in the resource path prior to the last collection in the hierarchy of the plurality of collections. For example, in FIG. 6 the "vlansprovider" provider may validate that member 620 (e.g., "2") is a member of the third collection 618 of VLANs., and may also validate the hierarchy of the plurality of collections in the resource path 608 to confirm that system "HL3D942" includes an Ethernet interface "NIC.Slot.1" that includes a VLANs "2".

The method 500 then proceeds to block 510 where a response to the URI request is received. The response received at block 510 may include information about the first resource identified in the URI request that was determined by the processing of the URI request by the first provider. In an embodiment, block 510 may be dependent on the type of URI request that was originally received. For example, if the URI request included a GET operation, a response may be generated by the resource identified in the URI and/or the server computing system 400 and transmitted back to the client computing device 300. However, if the URI request included, for example, a POST operation, a response may not necessarily be generated. In an embodiment, the server computing system 400 may transmit the response to the client computing device 300 which may receive the response, and the response may include information that was requested. For example, a response to the URI request that includes the URI 600 may include information about VLAN "2" that is included in the Ethernet interface "NIC.Slot.1" that is included in system "HL3D942."

Thus, systems and methods have been described that provide for a resource management system that routes and processes URI requests for managed computing systems by determining the last collection in a hierarchy of a plurality of collections in a resource path included in the URI request, and matching the last collection to a provider of a plurality of providers to process the URI request. Processing the request using the provider matched to the last collection eliminates the need for static mapping of hierarchical computing resources that is required to process the URI request from a "left to right" (or "first to last"/"beginning to end") manner. The methods and systems described herein reduce the amount of memory and other system resources needed to store and process complex static maps of the hierarchical resources in managed computing systems. Furthermore, one of skill in the art in possession of the present disclosure will recognize how the methods and systems are better equipped to handle dynamic members included in the plurality of collections.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A resource management system, comprising:
at least one managed computing system including a plurality of hierarchal computer resources; and
a server computing system that is coupled to the at least one managed computing system through a network and that includes a broker in communication with a plurality of providers, wherein the broker performs operations, comprising:
receiving a Uniform Resource Identifier (URI) request for a first resource of the plurality of hierarchal computer resources included in the at least one managed computing system, wherein the URI request includes a resource path that identifies the first resource by a hierarchy of a plurality of collections;
determining a last collection in the hierarchy of the plurality of collections that matches a first provider of the plurality of providers; and
forwarding the URI request directly to the first provider such that the first provider processes the URI request.

2. The system of claim 1, wherein the first provider performs operations, comprising:
validating the hierarchy of the plurality of collections included in the resource path.

3. The system of claim 1, wherein the first provider performs operations, comprising:
validating that a first member identified in the last collection is contained within a second member identified in a second collection that is previous to the last collection in the hierarchy of the plurality of collections.

4. The system of claim 1, wherein the server computing device includes at least one database that maps each collection in the hierarchy of the plurality of collections to a provider of the plurality of providers.

5. The system of claim 1, wherein the processing the URI request by the first provider includes processing the entire resource path included in the URI request.

6. The system of claim 1, wherein the determining the last collection in the hierarchy of the plurality of collections that matches the first provider of the plurality of providers includes the broker performing the operations, comprising:
scanning the resource path;
matching each collection in the hierarchy of the plurality of collections to a respective provider of the plurality of providers; and
generating a pointer to the last collection in the hierarchy of the plurality of collections.

7. The system of claim 1, further comprising:
a client computing device that is configured to:
transmit the URI request to the server computing system; and
receive, from the server computing system, a response that includes information about the first resource identified in the URI request that is determined by the processing of the URI request by the first provider.

8. An Information Handling System (IHS), comprising:
a communication system;
a processing system that is coupled to the communication system; and
a memory system that is coupled to the processing system and that includes instructions that, when executed by the processing system, cause the processing system to provide a management engine that includes a broker and a plurality of providers and causes the broker to perform operations, comprising:
receiving a Uniform Resource Identifier (URI) request for a first resource of a plurality of hierarchal computer resources included in at least one managed computing system, wherein the URI request includes a resource path that identifies the first resource by a hierarchy of a plurality of collections;
determining a last collection in the hierarchy of the plurality of collections that matches a first provider of the plurality of providers; and
forwarding the URI request directly to the first provider such that the first provider processes the URI request.

9. The IHS of claim 8, wherein the instructions that, when executed by the processing system, causes the first provider to perform operations, comprising:
validating the hierarchy of the resource path.

10. The IHS of claim 8, wherein the instructions that, when executed by the processing system, causes the first provider to perform operations, comprising:
validating that a first member identified in the last collection is contained within a second member identified in a second collection that is previous to the last collection in the hierarchy of the plurality of collections.

11. The IHS of claim 8, further comprising a database that maps each collection in the hierarchy of the plurality of collections to a provider of the plurality of providers.

12. The IHS of claim 8, wherein the processing the URI request by the first provider includes processing the entire resource path included in the URI request.

13. The IHS of claim 8, wherein the determining the last collection in the hierarchy of the plurality of collections that matches the first provider of the plurality of provider includes the broker:
scanning the resource path;
matching each collection in the hierarchy of the plurality of collections to a respective provider of the plurality of providers; and
generating a pointer to the last collection in the hierarchy of the plurality of collections.

14. The IHS of claim 8, wherein the processing the URI request by the first provider includes the first provider:
determining information about the first resource; and
transmitting the information to a client computing system that made the URI request.

15. A method for managing a plurality of resources of at least one managed computing system, comprising:
receiving, by a broker in a server computing system, a Uniform Resource Identifier (URI) request for a first resource of a plurality of hierarchal computer resources included in at least one managed computing system, wherein the URI request includes a resource path that identifies the first resource by a hierarchy of a plurality of collections;
determining, by the broker in the server computing system, a last collection in the hierarchy of the plurality of collections that matches a first provider of a plurality of providers that are included in the server computing system and that are each configured to process the URI request; and
forwarding, by the broker in the server computing system, the URI request to the first provider such that the first provider processes the URI request.

16. The method of claim 15, further comprising determining a set of providers based on the collections in the resource path.

17. The method of claim 15, further comprising associating each collection in the hierarchy of the plurality of collections to a provider of the plurality of providers.

18. The method of claim 15, wherein determining, by the broker in the server computing system, the last collection in the hierarchy of the plurality of collections that matches a first provider of a plurality of providers that are included in the server computing system and that are each configured to process the URI request includes the broker:
scanning the resource path;
matching each collection in the hierarchy of the plurality of collections to a respective provider of the plurality of providers; and
generating a pointer to the last collection in the hierarchy of the plurality of collections.

19. The method of claim 15, wherein determining, by the broker in the server computing system, the last collection in the hierarchy of the plurality of collections that matches a first provider of a plurality of providers that are included in the server computing system and that are each configured to process the URI request includes the broker:
determining a set of providers in the resource path;
scanning the resource path from the end of the resource path to the beginning of the first resource path until a collection is found;

matching the collection to a provider of the set of the providers; and establishing the collection that matches a provider of the set of the providers as the last collection.

20. The method of claim 15, further comprising:

receiving, by the broker in the server computing system, information about the first resource from the first provider that processed the request; and transmitting, by the broker in the server computing system, the information to a client computing system that made the request.

\* \* \* \* \*